(12) United States Patent
Kim et al.

(10) Patent No.: US 9,332,321 B2
(45) Date of Patent: May 3, 2016

(54) METHOD AND APPARATUS FOR GENERATING UNCOMPRESSED VIDEO DATA PACKET

(75) Inventors: Ho-dong Kim, Seoul (KR); Hae-young Jun, Seoul (KR); Hyuk-choon Kwon, Seoul (KR); Dong-seek Park, Suwon-si (KR); Soo-yeon Jung, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 138 days.

(21) Appl. No.: 13/216,970

(22) Filed: Aug. 24, 2011

(65) Prior Publication Data

US 2012/0051441 A1 Mar. 1, 2012

Related U.S. Application Data

(60) Provisional application No. 61/377,209, filed on Aug. 26, 2010.

(30) Foreign Application Priority Data

Dec. 21, 2010 (KR) .................. 10-2010-0131665

(51) Int. Cl.
*H04N 7/24* (2011.01)
*H04N 21/845* (2011.01)
*H04N 21/236* (2011.01)

(52) U.S. Cl.
CPC ......... *H04N 21/8458* (2013.01); *H04N 21/236* (2013.01)

(58) Field of Classification Search
CPC .................. H04N 21/236; H04N 21/8458
USPC ........................... 375/240.26, 240.27
See application file for complete search history.

(56) References Cited

U.S. PATENT DOCUMENTS

| 8,253,859 B2* | 8/2012 | Suzuki et al. ............. 348/554 |
| 2002/0087999 A1* | 7/2002 | Kashima ................. 725/100 |
| 2003/0081564 A1* | 5/2003 | Chan .................... 370/328 |
| 2003/0151610 A1* | 8/2003 | Kuriakin ................. G09G 5/42 345/589 |
| 2007/0270103 A1 | 11/2007 | Kim |
| 2007/0274382 A1* | 11/2007 | Hickey et al. .......... 375/240.03 |
| 2007/0288980 A1 | 12/2007 | Niu |
| 2008/0253462 A1* | 10/2008 | Singh et al. .......... 375/240.25 |

(Continued)

FOREIGN PATENT DOCUMENTS

| CN | 101331771 A | 12/2008 |
| EP | 2 023 632 A1 | 2/2009 |
| JP | 2004-531916 A | 10/2004 |
| JP | 2007-311928 A | 11/2007 |
| JP | 2007-325101 A | 12/2007 |
| WO | 02/49314 A2 | 6/2002 |
| WO | WO 2007132877 A1 * | 11/2007 |

OTHER PUBLICATIONS

International Search Report dated Feb. 29, 2012 issued in the International Application No. PCT/KR2011/006197.

(Continued)

*Primary Examiner* — Christopher S Kelley
*Assistant Examiner* — Zhihan Zhou
(74) *Attorney, Agent, or Firm* — Sughrue Mion, PLLC (57) ABSTRACT

Provided are a method and apparatus for generating a packet including uncompressed video data. The method includes: generating color component bit information indicating the number of bits of each color component of pixels of the uncompressed video data; and generating a packet including the color component bit information and the uncompressed video data.

15 Claims, 7 Drawing Sheets

(56) References Cited

U.S. PATENT DOCUMENTS

| | | | |
|---|---|---|---|
| 2009/0238286 A1* | 9/2009 | Kim et al. | 375/240.27 |
| 2009/0257487 A1* | 10/2009 | Wang et al. | 375/240.02 |
| 2010/0031098 A1* | 2/2010 | Kobayashi | 714/715 |
| 2010/0171883 A1* | 7/2010 | Elliott | 348/642 |
| 2015/0237299 A1 | 8/2015 | Suzuki et al. | |

OTHER PUBLICATIONS

Communication, dated Aug. 15, 2013, issued by the Mexican Institute of Industrial Property in counterpart Mexican Patent Application No. MX/a/2013/002254.

Communication dated Feb. 5, 2014 issued by the European Patent Office in counterpart European Application No. 11820156.5.

L. Gharai et al., "RTP Payload Format for Uncompressed Video", Network Working Group, Sep. 2005, pp. 1-18, XP002719197.

Hitachi, Ltd. et al., "High-Definition Multimedia Interface Specification Version 1.2a", Dec. 14, 2005, 193 pgs. total, XP030001518.

Communication dated Feb. 10, 2014 issued by the Australian Intellectual Property Office in counterpart Australian Application No. 2011294043.

Communication dated Feb. 10, 2014 issued by the Mexican Institute for Industrial Property in counterpart Mexican Application No. MX/a/2013/002254.

Communication dated Apr. 28, 2015 issued by the Japanese Patent Office in counterpart Japanese Patent Application No. 2013-525821.

Communication dated Jun. 30, 2015, issued by the State Intellectual Property Office of the People's Republic of China in counterpart Chinese Application No. 201180051901.8.

\* cited by examiner

| Bit | Content | |
|---|---|---|
| 0 | Planar/packed format | — 214a |
| 1-2 | RGB/YCbCr/YCoCg format | — 214b |
| 3-4 | 444/442/420 type | — 214c |
| 5-7 | Color element in packet | — 214d |
| 8-10 | 18/24/30/36/42 bpc (bits per pixel) | — 214g |
| Others | Reserved | — 214f |

| Bit | Content | |
|---|---|---|
| 0-2 | 18/24/30/36/42 bpc (bits per pixel) | — 615c |
| Other | Reserved | — 615b |

FIG. 8

METHOD AND APPARATUS FOR GENERATING UNCOMPRESSED VIDEO DATA PACKET

CROSS-REFERENCE TO RELATED PATENT APPLICATIONS

This application claims priority from Korean Patent Application No. 10-2010-0131665, filed on Dec. 21, 2010 in the Korean Intellectual Property Office, and U.S. Provisional Patent Application No. 61/377,209, filed on Aug. 26, 2010 in the U.S. Patent and Trademark Office, the disclosures of which are incorporated herein in their entireties by reference.

BACKGROUND

1. Field

Apparatuses and methods consistent with exemplary embodiments relate to generating uncompressed video data packets.

2. Description of the Related Art

According to the development of wireless communication technology, uncompressed video data can be transmitted using a wide bandwidth, instead of transmitting compressed video data using a narrow bandwidth. A transmitter device that transmits uncompressed video data transmits uncompressed video data by dividing the uncompressed video data into a plurality of packets. Furthermore, a header indicating information about the uncompressed video data included in the packets is included in the packets regarding the uncompressed video data, so that a receiver device receiving the packets including the uncompressed video data may process the packets.

SUMMARY

One or more exemplary embodiments provide methods and apparatuses for generating uncompressed video data packets.

According to an aspect of an exemplary embodiment, there is provided a method of generating a packet including uncompressed video data, the method including: generating color component bit information indicating the number of bits of each color component of pixels of the uncompressed video data that is to be included in the packet; and generating a packet including the color component bit information and the uncompressed video data.

The bit number of each color component of the color component bit information may be configured to have one of a plurality of set bit values.

The bit number of each color component of the color component bit information may be configured to be one of 6, 8, 10, 12, and 14 bits.

The bit number of each color component may be set such that each color component has the same number of bits or a different number of bits.

According to an aspect of another exemplary embodiment, there is provided an apparatus for generating a packet including uncompressed video data, the apparatus including: an information generating unit generating color component bit information indicating the number of bits of each color component of pixels of the uncompressed video data that is to be included in the packet; and a packet generating unit generating a packet including the color component bit information and the uncompressed video data.

The number of bits of each color component of the color component bit information may be configured to have one of a plurality of set bit values.

The bit number for each color component of the color component bit information may be configured to be one of 6, 8, 10, 12, and 14 bits.

The bit number of each color component may be set such that each color component has the same number of bits or a different number of bits.

According to an aspect of another exemplary embodiment, there is provided a computer-readable recording medium having embodied thereon a program for executing the method of generating a packet including uncompressed video data, the method including: generating color component bit information indicating the number of bits of each color component of pixels constituting the uncompressed video data that is to be included in the packet; and generating a packet including the color component bit information and the uncompressed video data.

According to an aspect of another exemplary embodiment, there is provided a method of generating a packet including uncompressed video data, the method including: generating at least one of color component bit information and pixel bit information, the color component bit information indicating a number of bits of each color component of pixels of the uncompressed video data that is to be included in the packet, and the pixel bit information indicating a number of bits of the pixels of the uncompressed video data that is to be included in the packet; and generating the packet including the uncompressed video data and the at least one of the color component bit information and the pixel bit information.

According to an aspect of another exemplary embodiment, there is provided a method of processing a packet including uncompressed video data, the method including: receiving the packet including the uncompressed video data and at least one of the color component bit information and the pixel bit information; and processing the received packet according to the at least one of the color component bit information and the pixel bit information, wherein the color component bit information indicates a number of bits of each color component of pixels of the uncompressed video data that is included in the packet, and the pixel bit information indicates a number of bits of the pixels of the uncompressed video data that is included in the packet.

BRIEF DESCRIPTION OF THE DRAWINGS

The above and other features and advantages will become more apparent by describing in detail exemplary embodiments with reference to the attached drawings in which.

DETAILED DESCRIPTION OF EXEMPLARY EMBODIMENTS

Exemplary embodiments will now be described more fully with reference to the accompanying drawings, in which like reference numerals refer to like elements throughout. Hereinafter, expressions such as "at least one of," when preceding a list of elements, modify the entire list of elements and do not modify the individual elements of the list. Further, the term "unit" as used herein means a hardware component and/or a software component that is executed by a hardware component such as a processor.

Figure 1:
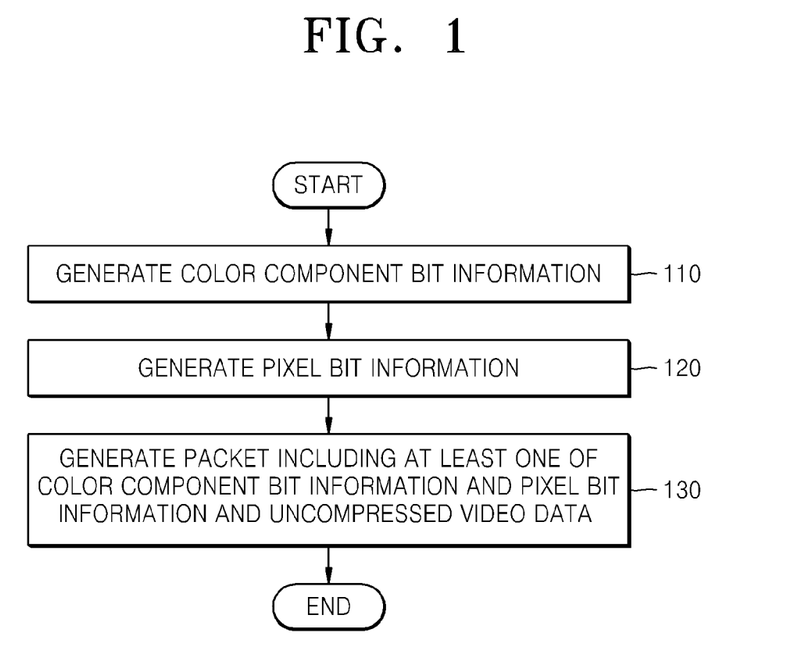
FIG. 1 is a flowchart illustrating a method of generating an uncompressed video data packet, according to an exemplary embodiment.

FIG. 1 is a flowchart illustrating a method of generating an uncompressed video data packet, according to an exemplary embodiment;

In operation 110, color component bit information indicating the number of bits of each color component of pixels constituting uncompressed video data that is to be included in an uncompressed video data packet is generated.

In operation 120, pixel bit information indicating the number of bits of pixels constituting uncompressed video data that is to be included in the uncompressed video data packet is generated.

In operation 130, a packet including at least one of the color component bit information and the pixel bit information and uncompressed video data is generated.

According to the current exemplary embodiment, when generating an uncompressed video data packet, at least one of the color component bit information and the pixel bit information regarding uncompressed video data that is to be included in the uncompressed video data packet is included in the uncompressed video data packet so as to solve, for example, the problem in the related art that when the number of bits of each color component of pixels constituting uncompressed video data included in the data packets or the pixel bit number is changed during transmission of an uncompressed video data packet, a receiver device which has received the packets including the modified uncompressed video data cannot process the received data packets.

According to another exemplary embodiment, the color component bit information and the pixel bit information may be included in a header of the uncompressed video data packet. Hereinafter, a structure of the header of an uncompressed video data packet according to an exemplary embodiment will be described with reference to FIGS. 2 and 6.

Figure 2:
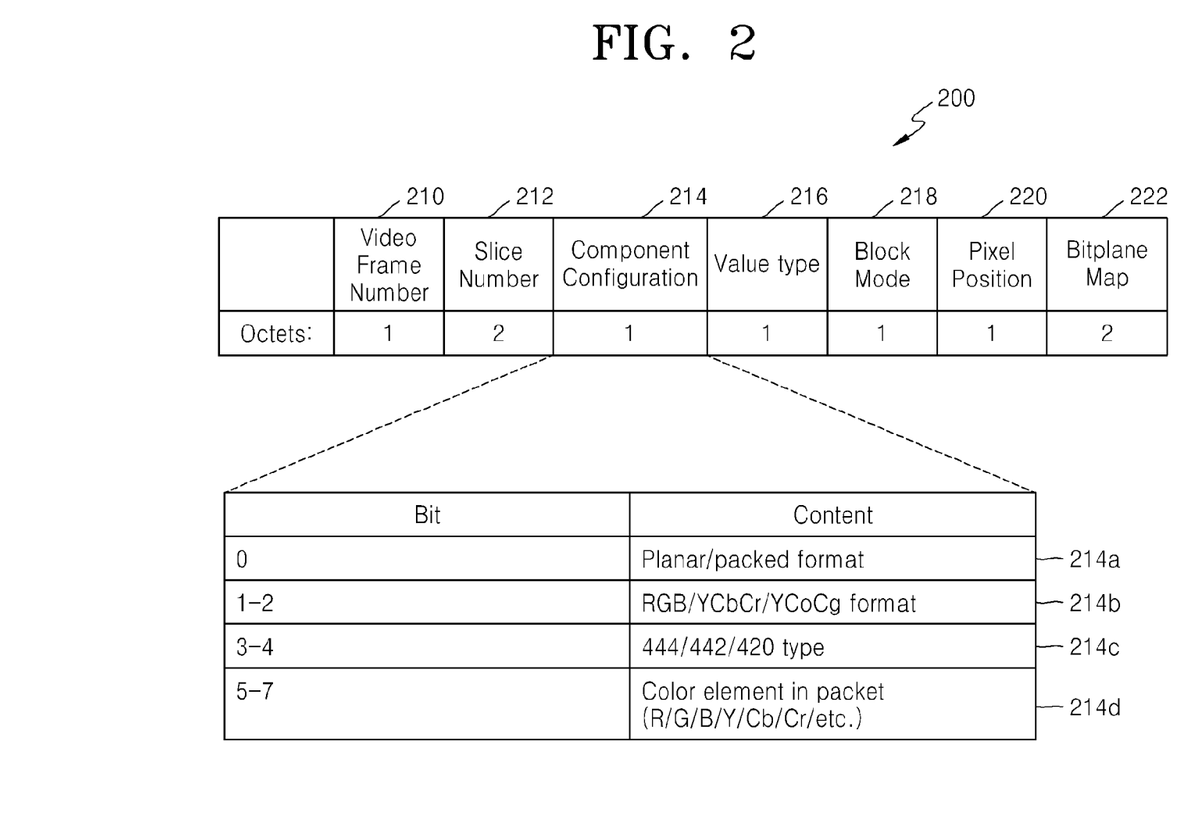
FIG. 2 is a block diagram for explaining a header of an uncompressed video data packet according to an exemplary embodiment.

FIG. 2 is a block diagram for explaining a header 200 of an uncompressed video data packet, according to an exemplary embodiment.

Referring to FIG. 2, the header 200 of an uncompressed video data packet includes a video frame number field 210, a slice number field 212, a component configuration field 214, a value type field 216, a block mode field 218, a pixel position field 220, and a bitplane map field 222.

The video frame number field 210 denotes the number of a video frame to which uncompressed video data included in an uncompressed video data packet belongs.

The slice number field 212 denotes the number of a slice to which the uncompressed video data included in the uncompressed video data packet belongs, when a video frame, to which the uncompressed video data included in the uncompressed video data packet belongs, is divided into a plurality of slices.

The component configuration field 214 denotes a format of the uncompressed video data included in the uncompressed video data packet.

The component configuration field 214 illustrated in FIG. 2 includes the four sub-fields: a first sub-field 214a, a second sub-field 214b, a third sub-field 214c, and a fourth sub-field 214d.

The first sub-field 214a includes first format information indicating whether the uncompressed video data has a planar format in which color components are extracted from each of pixels and arranged such that the same color components, among the extracted color components, are gathered together, or a packed format in which color components of pixels are gathered and arranged in units of pixels in an array.

For example, when a value of the first sub-field 214a is set as 0, the first sub-field 214a may denote that the uncompressed video data has a planar format, and when the value is set as 1, the first sub-field 214a may denote that the uncompressed video data has a packed format.

The second sub-field 214b includes second format information indicating whether the uncompressed video data has an RGB format, a YCbCr format, or a YCoCg format.

For example, when a value of the second sub-field 214b is set as 0b00, the second sub-field 214b may denote that the uncompressed video data has an RGB format; when the value is set as 0b01, the second sub-field 214b may denote that the uncompressed video data has a YCbCr format; and when the value is set as 0b10, the second sub-field 214b may denote that the uncompressed video data has a YCoCg format.

The third sub-field 214c includes sampling pattern information indicating, in the case when the uncompressed video data has a YCbCR format or a YCoCg format, whether the uncompressed video data has a 4:4:4 sampling pattern, a 4:2:2 sampling pattern, or a 4:2:0 sampling pattern.

For example, when a value of the third sub-field 214c is set as 0b00, the third sub-field 214c may denote that the uncompressed video data has a 4:4:4 sampling pattern; when the value is set as 0b01, the third sub-field 214c may denote that the uncompressed video data has a 4:2:2 sampling pattern; and when the value is set as 0b10, the third sub-field 214c may denote that the uncompressed video data has a 4:2:0 sampling pattern.

The fourth sub-field 214d includes color component identification information indicating, when only one color component is included in a uncompressed video data packet, from among a plurality of color components, which color component is included in the uncompressed video packet.

For example, the fourth sub-field 214d corresponds to Bits 5 through 7. When a value of Bit 5 is set as 1, the fourth sub-field 214d may denote that a color component R or Y is included; when a value of Bit 6 is set as 1, the fourth sub-field 214d may denote that a color component R, Cb, or Co is included; and when a value of Bit 7 is set as 1, the fourth sub-field 214d may denote that a color component B, Cr, or Cg is included.

The component configuration field 214 according to another exemplary embodiment may further include other fields, which will be described below with reference to FIGS. 3 through 5.

The value type field 216 denotes information indicating whether a pixel value of uncompressed video data included in the uncompressed video data packet is an original value of a pixel or a difference value between original values applied or not applied to entropy coding.

The block mode field 218 denotes, when pixels of uncompressed video data to be included in an uncompressed video data packet are included in a block constituting a predetermined number of pixels, a mode of the block.

For example, when a block mode is 1×1, one pixel may be included in one block, and when a block mode is 2×2, four pixels may be included in one block.

The pixel position field 220 indicates at which position pixels of uncompressed video data are located in each of the blocks.

The bitplane map field 222 indicates which bitplanes are included in an uncompressed video data packet.

Figure 3:
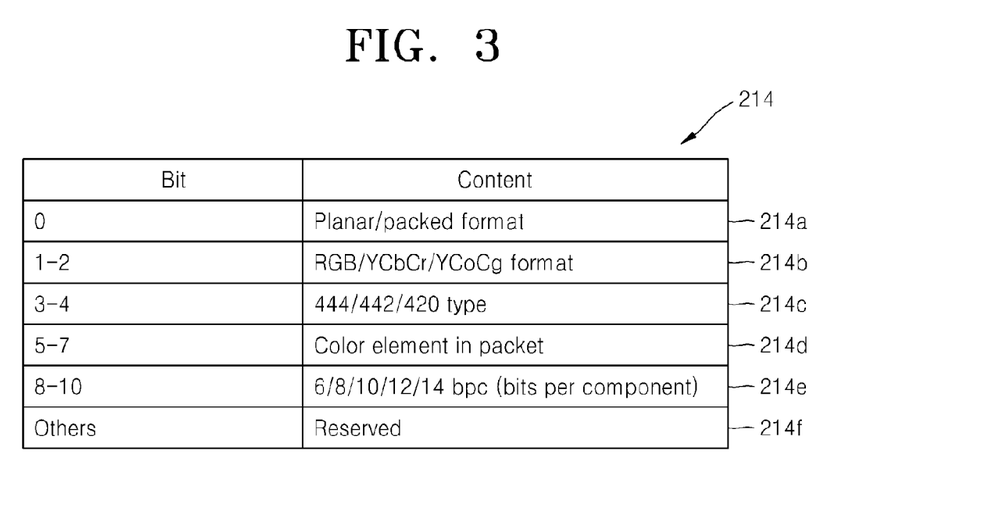
FIG. 3 is a block diagram for explaining a component configuration field according to another exemplary embodiment.

FIG. 3 is a block diagram for explaining a component configuration field 214 according to another exemplary embodiment.

Referring to FIG. 3, the component configuration field 214 includes first through sixth sub-fields 214a through 214f.

Here, the first through fourth sub-fields 214a through 214d are respectively the same as the first through fourth sub-fields 214a through 214d of the component configuration field 214 illustrated in FIG. 2, and thus a description thereof is not provided.

The fifth sub-field 214e includes color component bit information indicating the number of bits of each color component of pixels constituting uncompressed video data.

For example, when a value of the fifth sub-field 214e is set as 0b000, the fifth sub-field 214e may denote that the bit number of each color component of the uncompressed video data pixels is 6 bits; when the value is set as 0b001, the fifth sub-field 214e may denote that the bit number of each color component of the uncompressed video data pixels is 8 bits; when the value is set as 0b010, the fifth sub-field 214e may denote that the bit number of each color component of the uncompressed video data pixels is 10 bits; when the value is set as 0b011, the fifth sub-field 214e may denote that the bit number of each color component of the uncompressed video data pixels is 12 bits; and when the value is set as 0b100, the fifth sub-field 214e may denote that the bit number of each color component of the uncompressed video data pixels is 14 bits.

In the fifth sub-field 214e of FIG. 3, color components of the uncompressed video data pixels are configured to each have the same bit numbers. For example, in the fifth sub-field 214e, when the bit number of color component of the uncompressed video data pixels is set as 6 bits, 6 bits are used to represent each color component of the pixels.

The sixth sub-field 214f is a reserved field left empty for use in the future or for other information.

Figure 4:
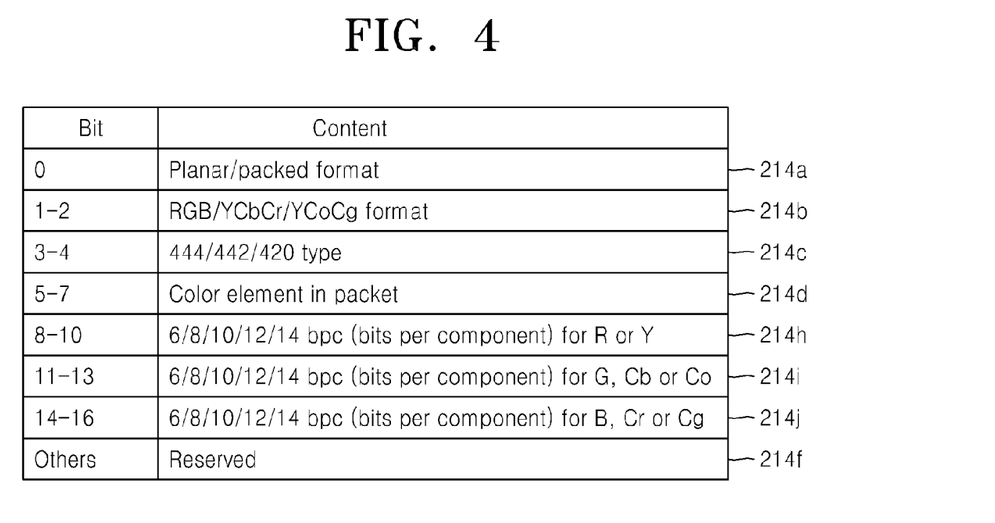
FIG. 4 is a block diagram for explaining a component configuration field according to another exemplary embodiment.

FIG. 4 is a block diagram for explaining a component configuration field 214 according to another exemplary embodiment.

Referring to FIG. 4, the component configuration field 214 includes first through eighth sub-fields 214a through 214d and 214h through 214f.

The first through fourth sub-fields 214a through 214d correspond to the first through fourth sub-fields 214a through 214d of the component configuration field 214 of FIG. 2, and the eighth sub-field 214f corresponds to the sixth sub-field 214f of the component configuration field 214 of FIG. 3, and thus, a description thereof is not provided.

The fifth sub-field 214h denotes the number of bits used to represent a color component R or Y.

For example, when a value of the fifth sub-field 214h is set as 0b000, the fifth sub-field 214h may denote that 6 bits are used to represent a color component R or Y of the uncompressed video data pixels; when the value is set as 0b001, the fifth sub-field 214h may denote that 8 bits are used; when the value is set as 0b010, the fifth sub-field 214h may denote that 10 bits are used; when the value is set as 0b011, the fifth sub-field 214h may denote that 12 bits are used; and when the value is set as 0b100, the fifth sub-field 214h may denote that 14 bits are used.

The sixth sub-field 214i denotes the number of bits used to represent a color component G, Cb, or Co.

For example, when a value of the sixth sub-field 214i is set as 0b000, the sixth sub-field 214i may denote that 6 bits are used to represent a color component G, Cb, or Co of the uncompressed video data pixels; when the value is set as 0b001, the sixth sub-field 214i may denote that 8 bits are used; when the value is set as 0b010, the sixth sub-field 214i may denote that 10 bits are used; when the value is set as 0b011, the sixth sub-field 214i may denote that 12 bits are used; and when the value is set as 0b100, the sixth sub-field 214i may denote that 14 bits are used.

The seventh sub-field 214j denotes the number of bits used to represent a color component B, Cr, or Cg.

For example, when a value of the seventh sub-field 214j is set as 0b000, the seventh sub-field 214j may denote that 6 bits are used to represent a color component B, Cr, or Cg of the uncompressed video data pixels; when the value is set as 0b001, the seventh sub-field 214j may denote that 8 bits are used; when the value is set as 0b010, the seventh sub-field 214j may denote that 10 bits are used; when the value is set as 0b011, the seventh sub-field 214j may denote that 12 bits are used; and when the value is set as 0b100, the seventh sub-field 214j may denote that 14 bits are used.

The fifth through seventh sub-fields 214h through 214j are configured such that color components of uncompressed video data pixels have the same number of bits or a different numbers of bits. For example, the fifth sub-field 214h, the sixth sub-field 214i, and the seventh sub-field 214j may be all set to represent 6 bits or may be respectively set to represent 6, 8, and 12 bits.

Figure 5:
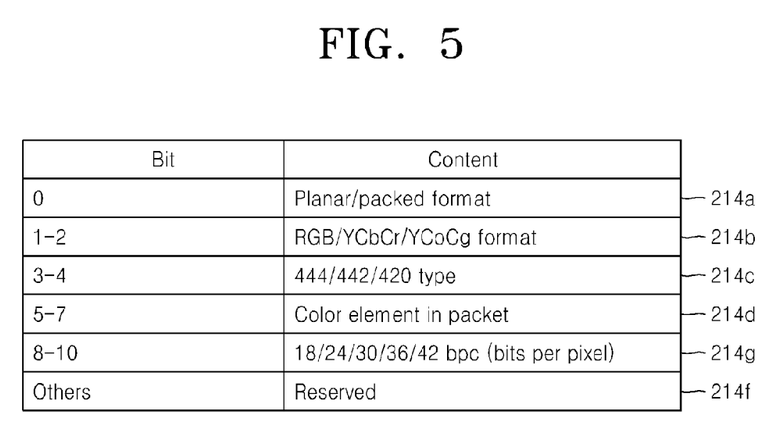
FIG. 5 is a block diagram for explaining a component configuration field according to another exemplary embodiment.

FIG. 5 is a block diagram for explaining a component configuration field 214 according to another exemplary embodiment.

Referring to FIG. 5, the component configuration field 214 includes first through sixth sub-fields 214a through 214f.

The first through fourth sub-fields 214a through 214d correspond to the first through fourth sub-fields 214a through 214d of the component configuration field 214 of FIG. 2, and the sixth sub-field 214f corresponds to the sixth sub-field 214f of the component configuration field 214 of FIG. 3, and thus, a description thereof is not provided.

The fifth sub-field 214g includes pixel bit information indicating the number of bits of pixels constituting uncompressed video data.

For example, when a value of the fifth sub-field 214g is set as 0b000, the fifth sub-field 214g may denote that the bit number of the uncompressed video data pixels is 18 bits; when the value is set as 0b001, the fifth sub-field 214g may denote that the bit number of the uncompressed video data pixels is 24 bits; when the value is set as 0b010, the fifth sub-field 214g may denote that the bit number of the uncompressed video data pixels is 30 bits; when the value is set as 0b011, the fifth sub-field 214g may denote that the bit number of the uncompressed video data pixels is 36 bits; and when the value is set as 0b100, the fifth sub-field 214g may denote that the bit number of the uncompressed video data pixels is 42 bits.

Figure 6:
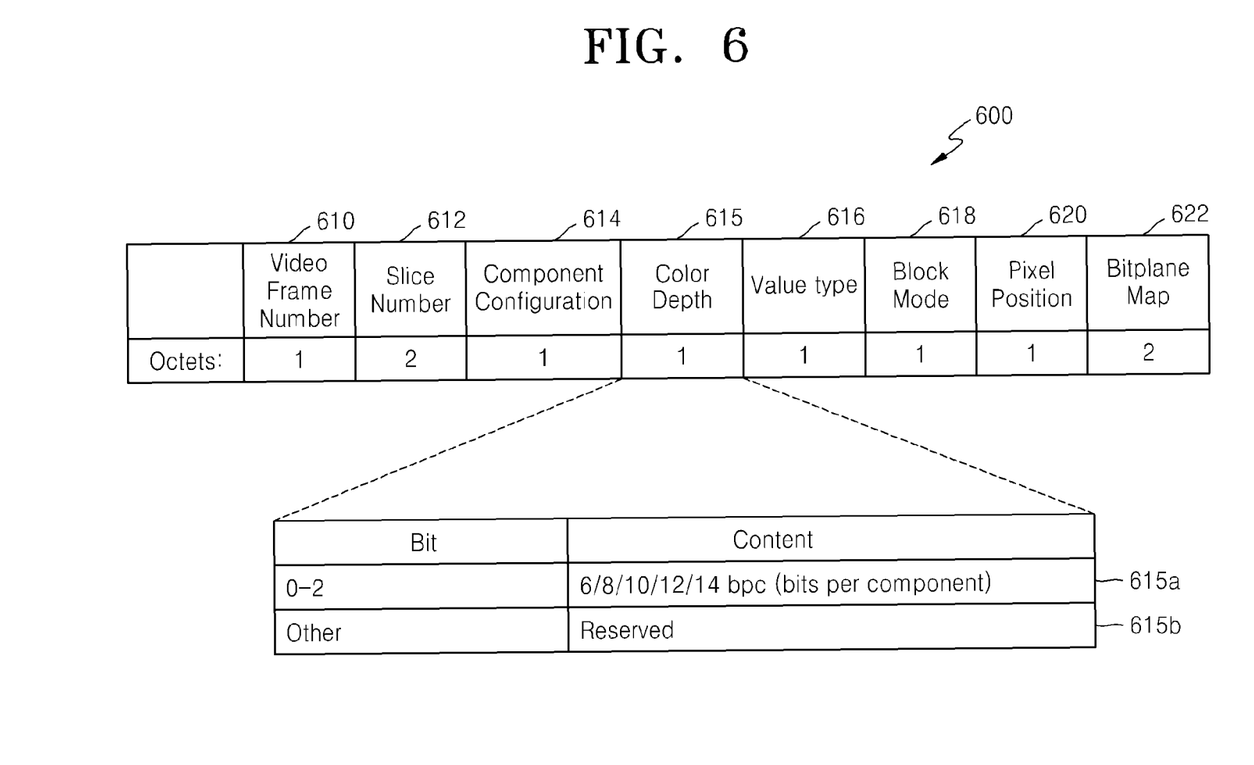
FIG. 6 is a block diagram for explaining a header of an uncompressed video data packet, according to another exemplary embodiment.

FIG. 6 is a block diagram for explaining a header 600 of an uncompressed video data packet, according to another exemplary embodiment.

Referring to FIG. 6, the header 600 of an uncompressed video data packet includes a video frame number field 610, a slice number field 612, a component configuration field 614, a color depth field 615, a value type field 616, a block mode field 618, a pixel position field 620, and a bitplane map field 622.

The video frame number field 610, the slice number field 612, the component configuration field 614, the value type field 616, the block mode field 618, the pixel position field 620, and the bitplane map field 622 respectively correspond to the video frame number field 210, the slice number field 212, the component configuration field 214, the value type field 216, the block mode field 218, the pixel position field 220, and the bitplane map field 222 of FIG. 2, and thus, a description thereof is not provided.

The color depth field 615 denotes information about a color depth of uncompressed video data.

The color dept field 615 illustrated in FIG. 6 includes the two sub-fields: a first sub-field 615 and a second sub-field 615b.

The first sub-field 615a includes color component bit information indicating the number of bits of each color component of pixels constituting uncompressed video data.

For example, when a value of the first sub-field 615a is set as 0b000, the first sub-field 615a may denote that the bit number of each color component of the uncompressed video data pixels is 6 bits; when the value is set as 0b001, the first sub-field 615a may denote that the bit number of each color component is 8 bits; when the value is set as 0b010, the first sub-field 615a may denote that the bit number of each color component is 10 bits; when the value is set as 0b011, the first sub-field 615a may denote that the bit number of each color component is 12 bits; when the value is set as 0b100, the first sub-field 615a may denote that the bit number of each color component is 14 bits.

The second sub-field 615b is a reserved field left empty for use in the future or for other information.

According to another exemplary embodiment, the color depth field 615 may have a different structure, which will be described below with reference to FIG. 7.

Figure 7:
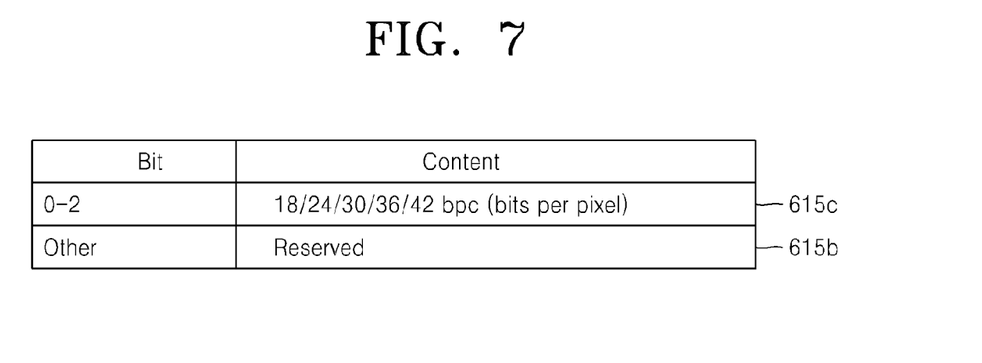
FIG. 7 is a block diagram for explaining a color depth field according to another exemplary embodiment.

FIG. 7 is a block diagram for explaining a color depth field 615 according to another exemplary embodiment.

Referring to FIG. 7, the color depth field 615 includes a first sub-field 615c and a second sub-field 615b.

The first sub-field 615c includes pixel bit information indicating the number of bits of pixels constituting uncompressed video data.

For example, when a value of the first sub-field 615c is set as 0b000, the first sub-field 615c may denote that the bit number of the uncompressed video data pixels is 18 bits; when the value is set as 0b001, the first sub-field 615c may denote that the bit number of the uncompressed video data pixels is 24 bits; when the value is set as 0b010, the first sub-field 615c may denote that the bit number of the uncompressed video data pixels is 30 bits; when the value is set as 0b011, the first sub-field 615c may denote that the bit number of the uncompressed video data pixels is 36 bits; and when the value is set as 0b100, the first sub-field 615c may denote that the bit number of the uncompressed video data pixels is 42 bits.

Figure 8:
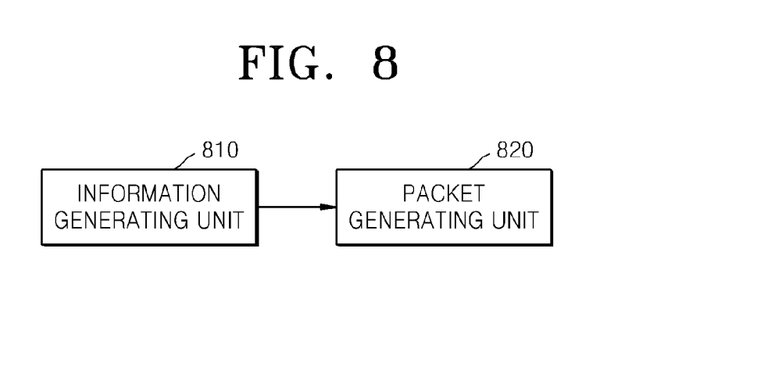
FIG. 8 is a block diagram of an uncompressed video data packet generating apparatus according to an exemplary embodiment.

FIG. 8 is a block diagram of an uncompressed video data packet generating apparatus according to an exemplary embodiment.

Referring to FIG. 8, the uncompressed video data packet generating apparatus includes an information generating unit 810 and a packet generating unit 820.

The information generating unit 810 generates color component bit information indicating the number of bits of each color component of pixels constituting uncompressed video data that is to be included in an uncompressed video data packet, and pixel bit information indicating the number of bits of pixels constituting the uncompressed video data.

The packet generating unit 820 generates an uncompressed video data packet including at least one of the color component bit information and the pixel bit information and uncompressed video data.

The uncompressed video data packet generated by the packet generating unit 820 may further include at least one of: first format information indicating whether the uncompressed video data has a planar format in which identical color components are extracted and arranged according to color components or a packed format in which color components of pixels are gathered in units of pixels in an array; second format information indicating whether the uncompressed video data has an RGB format, a YCbCr format, or a YCoCg format; sampling pattern information indicating, in the case when the uncompressed video data has a YCbCR format or a YCoCg format, whether the uncompressed video data has a 4:4:4 sampling pattern, a 4:2:2 sampling pattern, or a 4:2:0 sampling pattern; and color component identification information indicating, when only one color component is included in an uncompressed video data packet, from among a plurality of color components of the uncompressed video data, which color component is included in the uncompressed video data packet.

According to another exemplary embodiment, the uncompressed video data packet generating apparatus may further include a transmitting unit (not shown) transmitting the uncompressed video data packet generated by the packet generating unit 820.

Figure 9:
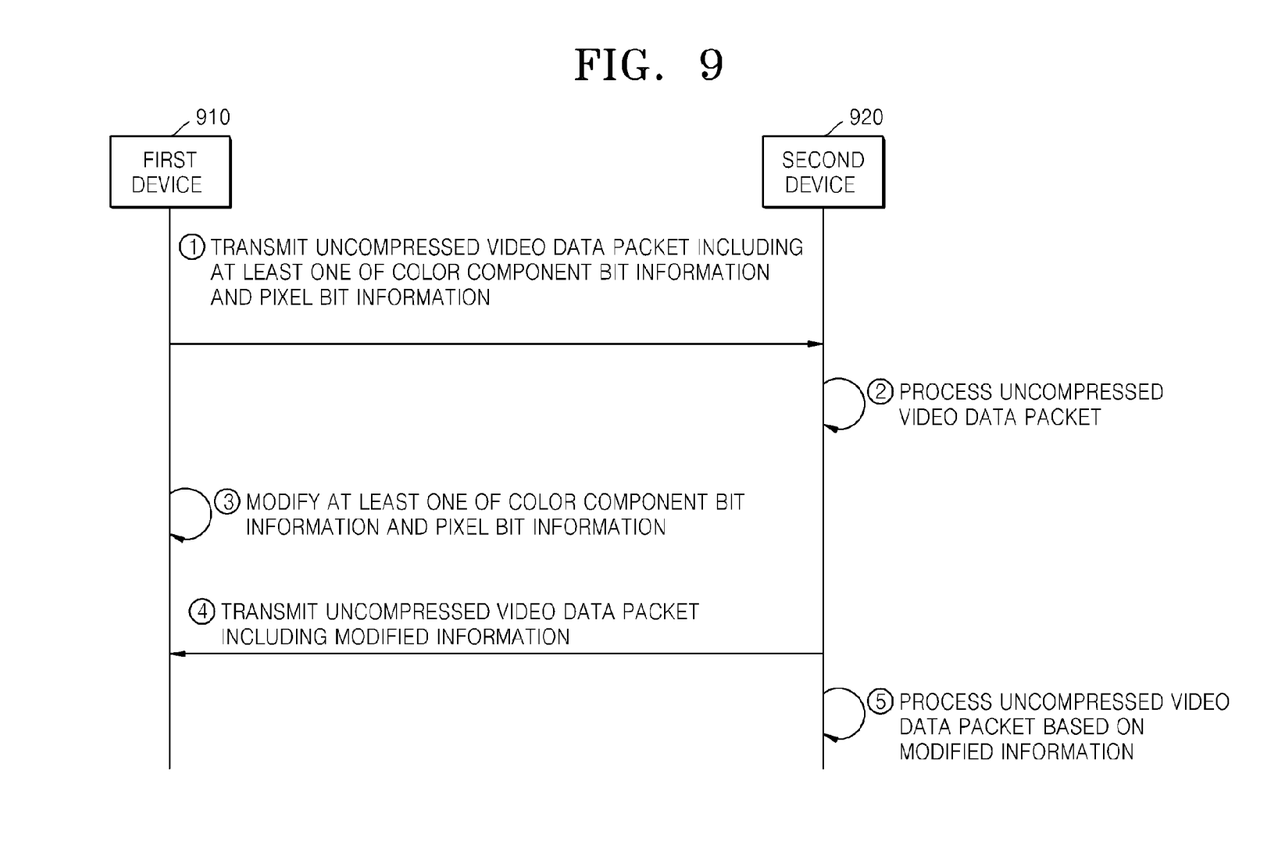
FIG. 9 is a flowchart illustrating a method of transmitting an uncompressed video data packet, according to an exemplary embodiment.

FIG. 9 is a flowchart illustrating a method of transmitting an uncompressed video data packet, according to an exemplary embodiment.

In operation 1, a first device 910 transmits an uncompressed video data packet including at least one of color component bit information and pixel bit information to a second device 920.

In operation 2, the second device 920 processes the received uncompressed video data packet based on at least one of the color component bit information and the pixel bit information.

In operation 3, the first device 910 modifies at least one of the color component bit information and the pixel bit information.

In operation 4, the first device 910 transmits the uncompressed video data packet including at least one of the modified color component bit information and the modified pixel bit information to the second device 920.

In operation 5, the second device 920 processes the received uncompressed video data packet based on at least one of the modified color component bit information and the modified pixel bit information.

One or more exemplary embodiments can be written as computer programs and can be implemented in general-use digital computers that execute the programs using a computer-readable recording medium.

Examples of the computer-readable recording medium include magnetic storage media (e.g., ROM, floppy disks, hard disks, etc.) and optical recording media (e.g., CD-ROMs, or DVDs).

While exemplary embodiments have been particularly shown and described above, it will be understood by those skilled in the art that various changes in form and details may be made therein without departing from the spirit and scope of the inventive concept as defined by the appended claims. The exemplary embodiments should be considered in descriptive sense only and not for purposes of limitation. Therefore, the scope of the inventive concept is defined not by the detailed description of exemplary embodiments, but by the appended claims, and all differences within the scope will be construed as being included in the present invention.

What is claimed is:

1. A method of generating a plurality of packets including respective uncompressed video data, the method comprising:
    generating respective color component bit information indicating a number of bits of each color component of pixels of the respective uncompressed video data that is to be included in the plurality of packets;
    generating first format information indicating whether the respective uncompressed video data has a planar format or a packed format; and
    generating the plurality of packets, each of the plurality of packets including the respective color component bit information, the first format information, and the respective uncompressed video data,
    wherein the planar format is a format in which color components are extracted from a plurality of pixels and arranged such that the same color components, among the extracted color components, are gathered together, and
    wherein the packed format is a format in which color components of the plurality of pixels are gathered and arranged in units of pixels in an array.

2. The method of claim 1, wherein the number of bits of each color component of the respective color component bit information is configured to selectively have one of a plurality of set bit values.

3. The method of claim 2, wherein the number of bits of each color component of the respective color component bit information is configured to selectively be one of 6 bits, 8 bits, 10 bits, 12 bits, and 14 bits.

4. The method of claim 2, wherein the number of bits of each color component is set such that each color component has a same number of bits or a different number of bits.

5. The method of claim 1, further comprising transmitting the generated plurality of packets including the respective color component bit information and the respective uncompressed video data.

6. The method of claim 1, wherein
    the color component bit information being separate from the uncompressed video data, and
    the generating the plurality of packets comprises generating the plurality of packets to be transmitted consecutively, each of the plurality of packets including the respective color component bit information, the first format information, and the respective uncompressed video data.

7. An apparatus for generating a plurality of packets including respective uncompressed video data, the apparatus comprising:
    an information generating unit configured to generate respective color component bit information indicating a number of bits of each color component of pixels of the respective uncompressed video data that is to be included in the plurality of packets and to generate first format information indicating whether the respective uncompressed video data has a planar format or a packed format; and
    a packet generating unit configured to generate the plurality of packets, each of the plurality of packets including the respective color component bit information, the first format information, and the respective uncompressed video data,
    wherein the planar format is a format in which color components are extracted from a plurality of pixels and arranged such that the same color components, among the extracted color components, are gathered together, and
    wherein the packed format is a format in which color components of the plurality of pixels are gathered and arranged in units of pixels in an array.

8. The apparatus of claim 7, wherein the number of bits of each color component of the respective color component bit information is configured to selectively have one of a plurality of set bit values.

9. The method of claim 8, wherein the number of bits for each color component of the respective color component bit information is configured to selectively be one of 6 bits, 8 bits, 10 bits, 12 bits, and 14 bits.

10. The apparatus of claim 8, wherein the number of bits of each color component is set such that each color component has a same number of bits or a different number of bits.

11. A non-transitory computer-readable recording medium having embodied thereon a program for executing the method of claim 1.

12. A method of generating a plurality of packets including respective uncompressed video data, the method comprising:
    generating at least one of respective color component bit information and respective pixel bit information for each of the plurality of packets, the respective color component bit information indicating a number of bits of each color component of pixels of the respective uncompressed video data that is to be included in the respective packet of the plurality of packets, and the respective pixel bit information indicating a number of bits of the pixels of the respective uncompressed video data that is to be included in the respective packet of the plurality of packets;
    generating first format information indicating whether the respective uncompressed video data has a planar format or a packed format; and
    generating the plurality of packets, each of the plurality of packets including the respective uncompressed video data, the first format information, and the at least one of the respective color component bit information and the respective pixel bit information,
    wherein the planar format is a format in which color components are extracted from a plurality of pixels and arranged such that the same color components, among the extracted color components, are gathered together, and
    wherein the packed format is a format in which color components of the plurality of pixels are gathered and arranged in units of pixels in an array.

13. A non-transitory computer-readable recording medium having embodied thereon a program for executing the method of claim 12.

14. A method of processing a plurality of packets including respective uncompressed video data, the method comprising:
receiving the plurality of packets, each of the plurality of packets including the respective uncompressed video data, first format information, and at least one of respective color component bit information and respective pixel bit information; and
processing the received plurality of packet according to the first format information, the at least one of the respective color component bit information and the respective pixel bit information,
wherein the respective color component bit information indicates a number of bits of each color component of pixels of the respective uncompressed video data that is included in the respective packet of the plurality of packets, the respective pixel bit information indicates a number of bits of the pixels of the respective uncompressed video data that is included in the respective packet of the plurality of packets, and the first format information indicates whether the respective uncompressed video data has a planar format or a packed format,
wherein the planar format is a format in which color components are extracted from a plurality of pixels and arranged such that the same color components, among the extracted color components, are gathered together, and
wherein the packed format is a format in which color components of the plurality of pixels are gathered and arranged in units of pixels in an array.

15. A non-transitory computer-readable recording medium having embodied thereon a program for executing the method of claim 14.

* * * * *